UNITED STATES PATENT OFFICE 2,590,937

ORGANOSILICON RESINS

Harold A. Clark, Midland, Mich., assignor to Dow Corning Corporation, Midland, Mich., a corporation of Michigan No Drawing. Application May 1, 1950, Serial No. 159,369

10 Claims. (Cl. 260—46.5)

The present application relates to new copolymeric organosilicon resins containing methylene radicals and oxygen atoms linking the silicon atoms and to their method of preparation.

The present application is a continuation in part of my copending applications, Serial Nos. 82,471 and 82,472, both filed March 19, 1949, now U. S. Patents 2,557,942 and 2,507,517, respectively.

Heretofore, the organosilicon resins, which have been of importance commercially, are those silicone resins which contained only Si—O—Si bonding.

It is an object of the present invention to produce organosilicon resins containing both methylene radicals and oxygen atoms linking the silicon atoms, which resins are useful as molding compounds and which upon curing, have very low weight loss.

In accordance with a preferred form of the present invention, a mixture is hydrolyzed and the hydrolyzate condensed which mixture contains silanes of the general formula $R_nSiCl_{4-n}$ and reactants of the general formula:

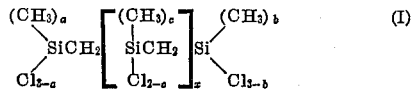
(I)

The hydrolysis and condensation is preferably conducted in the presence of a solvent to aid in the separation of the hydrolyzate and the aqueous phase.

The resin produced by this method is a siloxane copolymer which contains units of the general formula

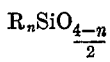

and units of the general formula:

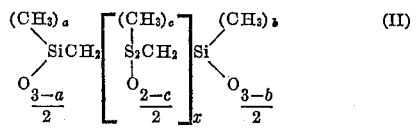
(II)

In the above formulae $a$, $b$, $c$, $x$ and $n$ each have values from 0 to 2 inclusive. R represents hydrocarbon radicals free of aliphatic unsaturation preferably of the group consisting of monocyclic aryl radicals and of alkyl radicals such as methyl to octadecyl.

Various compounds of general Formula I may be employed or mixtures thereof. Illustrative compound structures are ≡SiCH₂Si≡ where $x$ equals zero,

where $x$ equals one, and

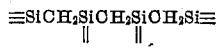

where $x$ equals 2. In these compounds, the unsatisfied bonds are occupied by methyl and chlorine. In the compounds of Formula I which are employed in the present process the average number of chlorine atoms per molecule ranges from 3 to 6. Enough of the silane of the formula $R_nSiCl_{4-n}$ is employed that the average number of chlorine atoms per silicon atom is from 1.8 to 3, and sufficient that the resin contains at least 10 per cent by weight of the units

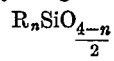

The proportion of $R_nSiCl_{4-n}$ is sufficiently small that the resin produced contains at least 5 per cent by weight of units of Formula II.

Since the hydrolysis mixture contains from 1.8 to 3 chlorines per silicon the resin produced contains from 0.9 to 1.5 oxygens per silicon. Preferred coating resins have such a ratio between 0.9 and 1.4 oxygens per silicon, whereas preferred molding resins have such a ratio between 1.3 and 1.5 oxygens per silicon.

The resins hereof contain at least five per cent by weight of the polymer units of Formula II and at least 10 per cent by weight of the polymer units

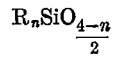

Reactants of the Formula I above, may be prepared by reacting a mixture of SiCl₄ and (CH₃)₃SiCl in ratio of one mol of the former per two mols of the latter compound. The reaction proceeds at a suitable rate at a temperature of about 400° C. and at pressure sufficient that at least a portion of the reactants are present as a condensed phase. The reaction is conducted in the presence of at least 1 per cent by weight of a Friedel-Crafts type catalyst, such as aluminum chloride or boron chloride. The condensation reaction which yields products of Formula I commences immediately, the yield being dependent to some extent upon the time of reaction. In such a reaction (CH₃)₂SiCl₂ and CH₃SiCl₃ are obtained as low boiling compounds. The products of Formula I are obtained as a residue after the starting silanes and these by-product silanes are removed. This residue contains a wide range of compounds corresponding to Formula I. Disilcarbanes (compositions of Formula I having two silicon atoms) are obtained boiling in the range of 177 to 195° C. at atmospheric pressure. Trisilcarbanes and tetrasilcarbanes boil in the range of 110° to 180° C. at 10 mm. The whole residue may be employed or if desired it may be fractionated and any particular component may be used.

The reactants of the Formula I in which $a$ and $b$ have values of from 1 to 2 inclusive and in which $x$ has a value of 0, may also be prepared from a compound of the formula $Cl_3SiCH_2SiCl_3$, which compound is disclosed in U. S. Patent No. 2,381,000, patented August 7, 1945. $Cl_3SiCH_2SiCl_3$ is reacted with from 1 to 4 mols of a methyl or phenyl Grignard, the amount depending upon the particular polysilcarbane desired. Compounds in which $a$ and $b$ have values of from 1 to 2 inclusive are disclosed and claimed in my copending applications, Serial Nos. 82,471 and 82,472, both filed March 19, 1949, now U. S. Patents 2,557,942 and 2,507,517, respectively, and a copending application of John T. Goodwin, Serial No. 22,252, filed April 20, 1948.

Reactants of the formula $R_nSiCl_{4-n}$, and which include $SiCl_4$, $CH_3SiCl_3$, $(CH_3)_2SiCl_2$, $C_6H_5SiCl_3$, $(C_6H_5)_2SiCl_2$ and $CH_3C_6H_5SiCl_2$, and mixtures thereof are well known in the art.

The hydrolysis of the mixture or organosilicon compositions to produce copolymeric resins may be carried out in a number of ways. Thus, the polysilcarbane and the chlorosilane may be mixed and cohydrolyzed and cocondensed by any of the methods known to the art. In such a process the reaction may be carried out either with or without a catalyst and in the presence or absence of a solvent. The hydrolysis and condensation may be carried out at any desired temperature, though temperatures between 0° C. and 250° C. are suitable. Alternatively, the reactants may be mixed and alcohol added to the mixture to produce a completely or partially alkoxylated material which is then hydrolyzed by adding to a mixture of water and a solvent such as toluene.

The resins of the present invention, which contain from 1.3 to 1.5 oxygens per silicon are particularly useful in molding compounds. In the preparation of molding compounds, it is preferred to mix a solution of such resin with filler, such as, calcium carbonate, asbestos or glass fiber. This mixture may then be dried and ground. The molding powder may then be molded under pressure to produce whatever product is desired. A catalyst in the resin solution may be employed if desired.

The resins of the present invention which contain 0.9 to 1.4 oxygens per silicon are particularly useful as coating resins, either in the form of varnish or pigmented to produce a paint or enamel. The paints and enamels so produced are of particular utility for coating hot apparatus such as furnaces, stacks and boilers.

*Example 1*

525 parts by weight of $CH_3Cl_2SiCH_2SiCl_3$ and 423 parts of $C_6H_5SiCl_3$ were mixed and 360 parts of isopropyl alcohol added to the mixture over a period of 2 to 3 hours. The residual HCl was removed by strip distillation and the alkoxy chlorosilane was diluted with 700 parts of toluene. This mixture was added to a solution of 485 parts of toluene and 2270 parts of water.

The organic layer was decanted, stirred with 150 parts of calcium carbonate and filtered. The resin solution was concentrated to 115° C. at atmospheric pressure. 650 parts of resin solution were obtained containing 39.5 per cent solids. This product was a high viscosity resin, a film of which air dried tack-free. It may be converted to a powder by evaporating the solvent which powder is useful as a molding compound. When a weighed sample of the powdered resin was heated for 3 hours at 250° C., the weight loss was 2.8 per cent; after heating for 100 hours at 250° C. the weight loss was 4.2 per cent. Based on reactants the resin contains 1.33 oxygens per silicon.

*Example 2*

262.5 parts by weight of $CH_3Cl_2SiCH_2SiCl_3$, 299 parts of $CH_3SiCl_3$ and 423 parts of $C_6H_5SiCl_3$ were mixed and 360 parts of isopropyl alcohol added to the mixture over a period of 2 to 3 hours. The alkoxy chlorosilane so formed was diluted with 700 parts of toluene. This mixture was added over a period of 1 hour to 478 parts of toluene, 200 parts of isopropyl alcohol and 115 parts of water.

The organic layer was decanted, stirred for one and one-half hours with 150 parts of calcium carbonate, filtered and concentrated to 120° C. to yield 150 parts of resin solution. This resin solution contained 60.9 per cent solids. A film of the resin solution air dried tack-free. The resin solution may be converted to a powder by solvent evaporation which powder is useful as a molding compound, preferably with a filler. After heating a weighed sample of the resin for 3 hours at 250° C., the weight loss was 3.3 per cent; after heating for 114 hours at 250° C. the weight loss was 4.6 per cent. Based on reactants the resin contains 1.41 oxygens per silicon.

*Example 3*

299 parts by weight of $CH_3SiCl_3$, 121 parts of $(CH_3)_2ClSiCH_2SiCl_3$, 141.5 parts of $Cl_3SiCH_2SiCl_3$ and 423 parts of $C_6H_5SiCl_3$, were mixed and 360 parts of isopropyl alcohol added to the mixture over a period of 2 to 3 hours. The alkoxy chlorosilane was diluted with 700 parts of toluene, and added over a period of 1 hour to 478 parts of toluene, 200 parts of isopropyl alcohol and 1500 parts of water.

The organic layer was then decanted, and stirred for one and one-half hours with 150 parts of calcium carbonate, filtered and concentrated to 120° C. to yield 757 parts of resin solution containing 50.9 per cent solids. A film of this resin solution air dries tack-free. A molding powder may be prepared by wetting a fibrous filler with the solution and drying. The weight loss determined on a weighed sample was 2.4 per cent after 3 hours at 250° C. and 3.6 per cent after 123 hours at 250° C. Based on reactants the resin contained 1.41 oxygens per silicon.

*Example 4*

525 parts by weight of $CH_3Cl_2SiCH_2SiCl_3$ and 423 parts of $C_6H_5SiCl_3$ were mixed and 360 parts of isopropyl alcohol added to the mixture over a period of 2 to 3 hours. The residual HCl was removed. The product was diluted with 700 parts of toluene. This mixture was added to a solution of 485 parts of toluene, 120 parts of isopropyl alcohol and 2270 parts of water.

The organic layer was of high viscosity and was separated by centrifuging. The product was diluted with solvent, stirred for 1 hour with 150 parts of calcium carbonate and filtered. 1640 parts of resin solution were obtained which contained 29.1 per cent solids. This resin solution had a viscosity at 25° C. of 237 centipoises. The resin solution air dries to a tack-free film. The solution may be converted to a powder by solvent evaporation. The powdered material has a flow point of about 250° C. and is useful as a molding powder. It can be molded at 250° C. under pressure. The weight loss of a sample of resin was 1.85 per cent after 3 hours at 250° C. and 2.7 per cent after 204 hours at 250° C. Based on reactants the resin contained 1.33 oxygens per silicon.

Example 5

382 parts by weight of $C_6H_5CH_3SiCl_2$ and 156 parts of $CH_3Cl_2SiCH_2SiCl_3$ were mixed and added to a hydrolysis mixture of 645 parts of toluene and 945 parts of water.

The organic layer was decanted, stirred with sodium bi-carbonate, filtered and concentrated under vacuum to 100 per cent resin. The resin was next heated for 20 hours at 160° to 170° C. to increase its viscosity. The resin was then diluted with toluene to yield 431 parts resin solution containing 63 per cent solids. The resin applied to sheet metal cures in 3 to 4 hours at 200° C. to a tough flexible film, which remains flexible after 165 hours at 250° C. After 1000 hours at 250° C. the film had not crazed. Based on reactants the resin contained 1.13 oxygens per silicon.

Example 6

382 parts by weight of $C_6H_5CH_3SiCl_2$, 141 parts of $C_6H_5SiCl_3$ and 175 parts of $CH_3Cl_2SiCH_2SiCl_3$ were mixed and added to a hydrolysis mixture of 683 parts of toluene and 1319 parts of water.

The organic layer was decanted, washed with water, stirred with sodium bi-carbonate, filtered and stripped of solvent. The resin was heated for seven hours at a temperature of from 160° to 170° C. to increase its viscosity. The resin was diluted with toluene to a concentration of 68.1 per cent resin. This resin applied to sheet metal cures in less than 1 hour at 250° C. to a tough flexible film. Based upon reactants this resin contained 1.17 oxygens per silicon.

Example 7

211.5 parts by weight of $C_6H_5SiCl_3$ and 157.5 parts of $CH_3Cl_2SiCH_2SiCl_3$ were mixed and 132 parts of isopropyl alcohol added to the mixture. A solution of 459.6 parts of $C_6H_5CH_3SiCl_2$ in 500 parts of toluene was added. The mixture was added to 300 parts of toluene and 1100 parts of hot water. The temperature of the reaction mixture varied from 52° C. at the beginning of the hydrolysis to 80° C. at the end.

The organic layer was decanted, stirred for 15 minutes with 35 parts of calcium carbonate and concentrated to 100 per cent solids. The resin was dissolved in an aromatic solvent of boiling range from 130° to 160° C. to give a solution containing 60 per cent resin. It was used to coat magnet wire, producing a tough flexible film on the wire. Based on reactants this resin contained 1.06 oxygens per silicon.

Example 8

When methyl Grignard reagent, $CH_3MgBr$, in amount of 119 parts in ether solution, is gradually added to 262.5 parts of $Cl_2CH_3SiCH_2SiCl_3$, a coupling reaction occurs. The product is cooled, filtered, and the ether removed in a stripping still. The product $Cl_2CH_3SiCH_2SiCH_3Cl_2$, may be separated by distillation. This product has a boiling point of 192° C. at atmospheric pressure and a density of 1.288 at 25° C.

A mixture of 242 parts of

$Cl_2CH_3SiCH_2SiCH_3Cl_2$ and 47.8 parts of $C_6H_5CH_3SiCl_2$ in 310 parts of toluene was added to 699 parts of $H_2O$ over a period of one-half hour at 5° to 28° C. 190 parts of toluene were then added to make a 25 per cent solution of the resin. The solution was washed four times with water at 50° C. and three times with cold water. The toluene was stripped from the resin to a 60 per cent concentration. The resin solution coated on metal cures in less than one hour at 150° C. to a tack-free film. The film remained flexible for over 165 hours at 250° C. Based on reactants this resin contained one oxygen per silicon.

Example 9

When equimolar amounts of $CH_3MgCl$ in ether solution and $CH_3Cl_2SiCH_2SiCl_2CH_3$ are mixed, coupling occurs. The product

$(CH_3)_2ClSiCH_2SiCl_2CH_3$ may be recovered by filtering and distilling the reaction mixture. This product has a boiling point of 186° C. at atmospheric pressure and a density of 1.160 at 25° C.

224 parts by weight of this composition were mixed with 211.5 parts of $C_6H_5SiCl_3$. This mixture was diluted with 129.9 parts of toluene. The mixture was added to 433 parts of toluene in 1000 parts of cold water. The organic layer was decanted, shaken with $NaHCO_3$, washed, filtered and concentrated to 55 per cent solids. The resin coated on a metal panel cured to a tack-free film in less than 1 hour at 100° C. The film remained flexible for over 168 hours at 250° C. Based on reactants the resin contained one oxygen per silicon.

Example 10

A mixture of 432 parts of

$(CH_3)_2ClSiCH_2SiCl_2CH_3$ and 108 parts of $(CH_3)_2ClSiCH_2SiCl_3$ was mixed with 60 parts of $C_6H_5SiCl_3$. 182 parts of toluene were then added to the mixture. The mixture was next added to 500 parts of toluene in 1200 parts of cold water. An additional 200 parts of toluene and 100 parts of n-butanol were added. The organic layer was separated, shaken with $NaHCO_3$, washed, filtered, stripped of solvent and bodied by heating to 180° to 190° C. for 6 hours. It was then diluted with an aromatic naphtha boiling from 110° to 160° C. to a concentration of 53½ per cent resin. A film of this resin solution cures in 1 hour at 250° C. yielding a tough pliable film. It had excellent electrical insulating properties, having a resistance of 1000 volts per mil thickness of the resin. Based on reactants this resin contained 1.04 oxygens per silicon.

Example 11

When a mixture of $SiCl_4$ and $(CH_3)_3SiCl$, in a ratio of one mol of the former per two mols of the latter and $AlCl_3$, in amount of 1 per cent by weight of the mixture, is heated for 10 hours at a temperature of 400° C. in a pressure autoclave and with a maximum pressure of 1250 pounds per square inch, rearrangement takes place. Low boiling compounds such as

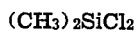
$(CH_3)_2SiCl_2$ and $CH_3SiCl_3$ are first removed, together with any unreacted $SiCl_4$ and $(CH_3)_3SiCl$. Disilcarbanes boiling in the range of from 177° to 195° C. are next obtained. These dimers are:

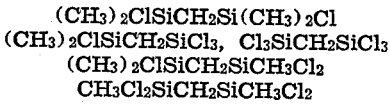
$(CH_3)_2ClSiCH_2Si(CH_3)_2Cl$
$(CH_3)_2ClSiCH_2SiCl_3$, $Cl_3SiCH_2SiCl_3$
$(CH_3)_2ClSiCH_2SiCH_3Cl_2$
$CH_3Cl_2SiCH_2SiCH_3Cl_2$ and $CH_3Cl_2SiCH_2SiCl_3$. A higher boiling cut in the range of 110° to 180° C. at 10 mm. pressure is then obtained. This higher boiling cut contains principally trisilcarbanes and some tetrasilcarbanes. The trimers contain an average of 5 chlorine atoms and 3 methyl radicals per molecule and the tetramers contain an average of 7 chlorine atoms and 3 methyl radicals per molecule. The ratio of trimer to tetramer by weight is 2 to 1.

500 parts of the higher boiling cut containing trimers and tetramers was mixed with 500 parts of $C_6H_5SiCl_3$ and 360 parts of isopropyl alcohol were added to the mixture. The product was diluted with 750 parts of toluene and added rapidly to a hydrolysis mixture of 538 parts of toluene, 200 parts of isopropyl alcohol and 1420 parts of water. The organic layer was next decanted, stirred with 30 to 40 parts of calcium carbonate, and dried over 30 to 40 parts of anhydrous sodium sulfate. The resin solution was concentrated to 125° C. 839 parts of a highly viscous resin solution were obtained which contained 60 per cent solids. This resin forms tough flexible coatings when a film of the solution is baked on the coated surface. When a sample of the resin, free of solvent was heated for 3 hours at 250° C. the weight loss was 5.9 per cent. Based on reactants this resin contained 1.06 oxygens per silicon.

*Example 12*

A resin was prepared by mixing 1.794 kilograms of $(CH_3)_3SiCl_3$, 0.525 kilogram of $$CH_3Cl_2SiCH_2SiCl_3$$

and 0.960 kilogram of iso-propanol. Following the alkoxylation reaction, 0.516 kilogram of $(CH_3)_2SiCl_2$ was added and the whole diluted with three liters of toluence. This product and five liters of water were simultaneously added to a hydrolysis kettle in continuous streams, and product was continuously withdrawn to maintain a constant level. The kettle temperature was about 80° C. The product was decanted, stirred with 5 per cent (based on resin weight) of calcium carbonate, filtered and concentrated to 2.4 kilograms of solution which contained 50 per cent of resin. This resin was used to impregnate glass fiber flock which was dried. The molding powder so prepared was molded under pressure at 200° C. The molded product contained 23 per cent resin. Based on the total product weight, 8 per cent was organic and 92 per cent was inorganic. Based on reactants the resin contained 1.35 oxygens per silicon.

That which is claimed is:

1. An organosilicon copolymer resin in which the units are of the general formula:

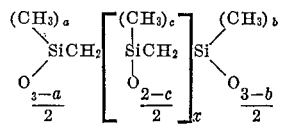

and of the general formula

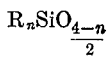

where $a$, $b$, $c$, $x$ and $n$ each have values of from 0 to 2 inclusive, and R is a radical of the group consisting of alkyl and monocyclicaryl radicals, in which the ratio of oxygen atoms to Si atoms is 0.9 to 1.5 and the said units are connected together by silicon-oxygen-silicon bonding.

2. A resin in accord with claim 1 in which R represents an alkyl radical.

3. An organosilicon copolymer resin in which the units are of the formula,

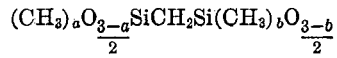

and

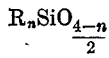

where $a$, $b$ and $n$ each have a value of from 0 to 2 inclusive and R is a radical of the group consisting of alkyl and monocyclicaryl radicals, in which resin the ratio of the oxygen atoms to Si atoms is from 0.9 to 1.5, and in which resin the stated units are bonded together by silicon-oxygen-silicon bonding.

4. A resin in accord with claim 3 in which R represents an alkyl radical.

5. The method of preparing organosilicon copolymer resins which comprises cohydrolyzing by reaction with water, a mixture of material of the average general formula:

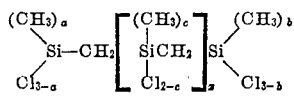

in which composition the average member of chlorine atoms per molecule is from 3 to 6 and of a material of the average general formula $R_nSiCl_{4-n}$, in which formulas $a$, $b$, $c$, $x$ and $n$ each have values of from 0 to 2 inclusive, and R represents a radical of the group consisting of alkyl and monocyclicaryl radicals, and cocondensing the hydrolysis product thereof, whereby there is produced an organosilicon copolymer resin in which the units are of general formula:

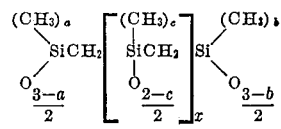

and of the general formula

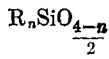

in which hydrolysis mixture the ratio of chlorine atoms to silicon atoms is from 1.8 to 3.

6. The method of preparing organosilicon copolymer resins in accord with claim 5 where R represents an alkyl radical.

7. The method of preparing organosilicon copolymer resins which comprises cohydrolyzing by reaction with water, a mixture of material of the average general formula

in which composition the average number of chlorine atoms per molecule is from 3 to 6, and silane of the average general formula $R_nSiCl_{4-n}$, in which formulas $a$, $b$, and $n$ each have a value of from 0 to 2 inclusive, and R represents a radical selected from the group consisting of alkyl and monocyclicaryl radicals and concondensing the hydrolysis product thereof, whereby there is produced an organosilicon copolymer resin in which the units are of the general formula

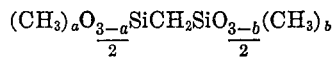

and of the average general formula

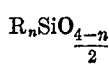

in which mixture of silane and material the number ratio of chlorine atoms to silicon atoms is from 1.8 to 3.

8. The method of preparing organosilicon copolymer resins in accord with claim 7 in which R represents alkyl radicals.

9. A resin in accord with claim 1 in which R represents a phenyl radical.

10. The method of preparing organosilicon copolymer resins in accord with claim 5 where R represents a phenyl radical.

HAROLD A. CLARK.

REFERENCES CITED

The following references are of record in the file of this patent:

UNITED STATES PATENTS

| Number | Name | Date |
|---|---|---|
| 2,486,162 | Hyde | Oct. 25, 1949 |
| 2,507,516 | Clark | May 16, 1950 |
| 2,507,517 | Clark | May 16, 1950 |